324-373 LKU SR
12/15/87 OR RE 32,564

United States Patent [19]
Scholberg

[11] E Patent Number: Re. 32,564
[45] Reissued Date of Patent: Dec. 15, 1987

[54] APPARATUS FOR DETERMINING THE RESISTIVITY OF A SUBSURFACE EARTH FORMATION AT DIFFERENT LATERAL DISTANCES FROM A BORE HOLE WALL

[75] Inventor: Andre Scholberg, Corseaux, Switzerland

[73] Assignee: Schlumberger Technology Corporation, New York, N.Y.

[21] Appl. No.: 177,560

[22] Filed: Aug. 13, 1980

Related U.S. Patent Documents

Reissue of:
[64] Patent No.: 3,772,589
Issued: Nov. 13, 1973
Appl. No.: 233,668
Filed: Mar. 10, 1972

[30] Foreign Application Priority Data

Mar. 11, 1971 [FR] France ..... 71.08426

[51] Int. Cl.[4] ..... G01V 3/24
[52] U.S. Cl. ..... 324/373; 324/375
[58] Field of Search ..... 324/366, 373–375

[56] References Cited

U.S. PATENT DOCUMENTS

| | | | |
|---|---|---|---|
| 2,712,627 | 7/1955 | Doll | 324/373 X |
| 2,712,628 | 7/1955 | Doll | 324/373 |
| 2,712,629 | 7/1955 | Doll | 324/374 |
| 2,712,630 | 7/1955 | Doll | 324/373 |
| 2,770,771 | 11/1956 | Schuster | 324/373 |
| 2,779,912 | 1/1957 | Waters | 324/371 |
| 2,880,389 | 3/1959 | Ferre et al. | 324/375 |
| 2,925,551 | 2/1960 | Segesman | 324/373 |
| 2,930,968 | 3/1960 | Ferre | 324/373 |
| 3,181,057 | 4/1965 | Bravenec | 324/373 |
| 3,539,910 | 11/1970 | Henry et al. | 324/366 |
| 3,798,966 | 3/1974 | Planche | 73/151 |

FOREIGN PATENT DOCUMENTS 1322537 7/1973 United Kingdom .
1338292 11/1973 United Kingdom .

OTHER PUBLICATIONS

Guyod, Hubert; "The Shielded-Electrode Method", *World Oil*, Dec. 1951, pp. 134, 136, 138, 140, 142, 144.
Doll, H. G. "The Laterolog:" *A New Resistivity Logging Method with Electrodes Using an Auto. Focusing System;* Journal of Petrol. Trans, AIME, vol. 192, 1951, pp. 305–316.
Kosenkov, O. M. "*The Depth of Penetration of the Resistivity Profile by the Automatic Control of the Electric Field*", Gedogiya i Razved, No. 7, pp. 81–87 (1969).

*Primary Examiner*—Gerard R. Strecker
*Attorney, Agent, or Firm*—Stephen L. Borst; David H. Carroll; Peter Y. Lee

[57] ABSTRACT

Apparatus for investigating subsurface earth formations traversed by a borehole comprising a system of electrodes consisting of a central electrode $A_0$ and four pairs of electrodes $M_1$–$M'_1$, $M_2$–$M'_2$, $A_1$–$A'_1$, $A_2$–$A'_2$ respectively short-circuited and aligned symmetrically on both sides of the electrode $A_0$.

This apparatus comprises arrangements which, for a frequency $f_2$, establish a potential gradient between electrodes $A_1$–$A'_1$ and $A_2$–$A'_2$. A source of alternating current of frequency $f_1$ is connected between the electrodes $A_1$–$A'_1$ and $A_2$–$A'_2$ and a source of alternating current of frequency $f_2$ between a surface electrode B and electrodes $A_2$–$A'_2$. The potential difference between electrodes $M_1$–$M_2$ and $M'_1$–$M'_2$ is maintained substantially at zero by circulating a current between electrodes $A_1$–$A'_1$ and electrode $A_0$.

Such an apparatus allows simultaneous measurement in a borehole of the electrical resistivities of the subsurface earth formations extending over relatively small and relatively large lateral distances from the wall of the borehole.

22 Claims, 2 Drawing Figures

APPARATUS FOR DETERMINING THE RESISTIVITY OF A SUBSURFACE EARTH FORMATION AT DIFFERENT LATERAL DISTANCES FROM A BORE HOLE WALL

Matter enclosed in heavy brackets [ ] appears in the original patent but forms no part of this reissue specification; matter printed in italics indicates the additions made by reissue.

This invention relates to an apparatus for electrical well logging and, more particularly, to an apparatus designed to simultaneously measure, in a borehole, the electrical resistivities of the subsurface earth formations extending over relatively small and relatively large lateral distances from the wall of the said borehole.

A known method of electrical well logging consists of using electrical fields produced and adjusted to cause the current emitted by an electrode in the borehole to follow a path confined to a zone substantially perpendicular to the wall of the said borehole. In a first type of apparatus, this perpendicularity of the current is maintained over a sufficient lateral distance from the wall of the borehole so that the part of the path taken by the said current through the conducting fluid filling the borehole, the mudcake and, where applicable, the invaded zone is short in respect to the part of the path taken by this current through the materials located at a relatively large distance from the wall of the borehole. Consequently, the logs obtained when recording the variations in a difference in potential, appropriately chosen and related to the flow of the current through the subsurface earth formations, represent the electrical resistivities of the formations extending over a relatively large lateral distance from the wall of the borehole. In another type of apparatus, the perpendicularity of the current emitted in the borehole is maintained over a shorter lateral distance corresponding substantially to the traversal of the liquid filling the borehole and the mudcake. This current travels a short distance through the neighboring subsurface earth formations, the portion of its path through the borehole liquid and mudcake nonetheless remaining relatively short in respect to its total path. Consequently, the logs obtained when recording the variations in a difference in potential related to this current flow represent, with greater exactitude, the electrical resistivities of the formations in the neighborhood of the wall, the influence of the liquid filling the borehole, the mudcake and materials located at a great distance from the wall of the borehole being practically eliminated.

One prior-art apparatus, described in U.S. Pat. No. 2,712,630 issued on July 5, 1955 to Doll, corresponding to French Pat. No. 1,072,318, allows the simultaneous investigation of lateral zones located in the neighborhood of the wall of the borehole and zones extending over a relatively large lateral distance from the said wall. In its investigation probe, this apparatus uses a system of electrodes arranged longitudinally and comprising one central electrode and four pairs of electrodes arranged symmetrically on both sides of the central electrode at increasing distances, the distance between the said electrode and the electrodes of the fourth pair being such that the latter connot be considered to be electrically infinite in respect to the central electrode. One terminal of a source of alternating electric current of frequency $f_1$ is connected to the central electrode, and the other terminal is connected to the electrodes of the fourth pair, whereas one terminal of a source of alternating current of frequency $f_2$ is connected to the central electrode and the other terminal to the ground. An amplifier, responding to the potential differences of frequency $f_1$, is placed between the electrodes of the first and second pairs in order to circulate an alternating current of frequency $f_1$ between the electrodes of the third and fourth pairs, its amplitude and phase being such that they reduce substantially to zero the potential differences of frequency $f_1$ between the electrodes of the first and second pairs. A second amplifier, responding to the potential differences of frequency $f_2$, is also connected between the electrodes of the first and second pairs so as to circulate between the electrodes of the third pair and the ground an alternating current of frequency $f_2$ whose amplitude and phase are such that they reduce substantially to zero the potential differences of frequency $f_2$ between the electrodes of the first and second pairs. Under these conditions, the measurement of potential differences of frequencies $f_1$ and $f_2$ between the ground and the point located where the potential gradient is maintained substantially at zero allow the obtaining of values of the electrical resistivities of the materials located in the zones extending over respectively small and large lateral distances from the borehole.

This invention describes an apparaus performing the same measurements as the apparatus described above; it operates along basically the same lines but constitutes an improved version.

A specific objective of the present invention is an apparatus for the investigation of subsurface earth formations traversed by a borhole containing a column of conducting liquid of the type comprising a system of electrodes distributed longitudinally inside a probe suspended from a cable and capable of being moved inside the borehole, the said system comprising a central electrode and four pairs of electrodes, respectively short-circuited and aligned symmetrically on both sides of the said central electrode at increasing distances, the central electrode and the electrodes of the third and fourth pairs being called current electrodes, the electrodes of the first and second pairs being called voltage electrode, the spacing between the central electrode and the electrodes of the fourth pair being smaller than that for which the latter can be considered to be electrically infinite in respect to the central electrode, circuits producing an alternating current of frequency $f_1$ connected between the electrodes of the fourth pair and one of the two other current electrodes, circuits producing an alternating current of frequency $f_2$ connected between one of the said current electrodes and one electrode considered to be electrically infinite in respect to the system, an amplifier unit placed between the voltage electrodes and designed to produce a substantially zero potential gradient, at least at frequencies $f_1$ and $f_2$, between the said voltage electrodes by circulating a current between the central electrode and the electrodes of the third pair, and indicating devices for determining the effect related to the circulation of currents of frequencies $f_1$ and $f_2$ and representative of the electrical resistivities of the formations located respectively in the zones extending over relatively small and relatively large distances from the borehole, the said apparatus being primarily of interest in that, in addition, it comprises means for establishing, at frequency $f_2$, of a potential gradient of a determined value between the electrodes of the third and fourth pairs. In a preferred embodiment of the apparatus, this potential gradient is established at a substantially zero value corresponding to a virtual shortcircuiting, at frequency $f_2$, of the electrodes of the third and fourth pairs.

Such an apparatus has considerable advantages. It is a known fact that greater depths of lateral investigation to subsurface earth formations are possible with better focussing of the current emitted by the central electrode. The creation, for frequency $f_2$ alone, of a short circuit between the electrodes of the third and fourth pairs or, more generally, of a given potential gradient between these electrodes corresponds to optimum use of the system in providing this focussing. It is certain that the participation of the electrodes of the fourth pair, which are the farthest away from the center of the system, considerably reinforces the field around the beam emitted by the central electrode and thus keeps it perpendicular to the system over a distance which is considerably larger than if the electrodes of the third pair, closer to the center but, above all, shorter, were alone responsible for this field. Thus, the apparatus of the invention allows considerably deeper investigation than the apparatus described previously which uses the electrodes of the fourth pair only for investigation at a short distance from the wall of the borehole.

In accordance with an important sub-feature of the invention, the alternating current of frequency f1 is applied between the electrodes of the third and fourth pairs, the alternating current of frequency $f_2$ is applied between an electrode placed on the surface and the electrodes of the fourth pair, whereas the amplifier unit placed between the voltage electrodes causes to pass between the electrodes of the third pair and the central electrode the current which annuls the potential difference between the said voltage electrodes.

In accordance with another important sub-feature of the invention, the circuits producing the currents of frequencies $f_1$ and $f_2$ comprise a source of alternating current of frequency $f_1$ connected between the terminals of the primary winding of a transformer, a source of alternating current of frequency $f_2$ connected between the electrode placed on the surface and an intermediate point on the secondary winding of the said transformer, the said sources and the said amplifier being placed on the surface, and an amplifier of the current of frequency $f_1$, incorporated in the probe, whose input transformer has its primary winding terminals connected by means of the cable to the secondary winding terminals of the transformer on the surface, and an intermediate point on the said primary winding connected to the electrodes of the fourth pair, and whose output transformer has its secondary winding terminals connected to the electrodes of the third and fourth pairs, the said amplifier having, at the frequency $f_2$, an output impedance such that, at the same time it delivers to the electrodes of the third an fourth pairs a current of frequency $f_1$ and produces, at frequency $f_2$, a given potential gradient, possibly zero, between these same electrodes.

In accordance with a further important sub-feature of the invention, the creation of this potential gradient can be achieved by special arrangements comprising a fifth pair of short-circuited electrodes, placed symmetrically on both sides of the central electrode between the electrodes of the third and fourth pairs at a short distance from the electrodes of the third pair, and an amplifier of the current of frequency $f_2$, incorporated in the probe, whose input is connected between the electrodes of the fourth and the said fifth pair and the output between the electrodes of the third and fourth pairs to supply them with a current maintaining a given potential gradient possibly zero, between the electrodes of the fourth and fifth pairs.

Naturally, these special arrangements can alone produce the desired potential gradient. Nonetheless, in the case in which the current electrodes are supplied by the circuits described above, which themselves produce this potential gradient, they can be used to advantage to ensure that this potential gradient is maintained.

For a better understanding of the invention together with further objects and advantages thereof, reference may be made to the following description taken in connection with the appended drawings in which.

Figure 1:
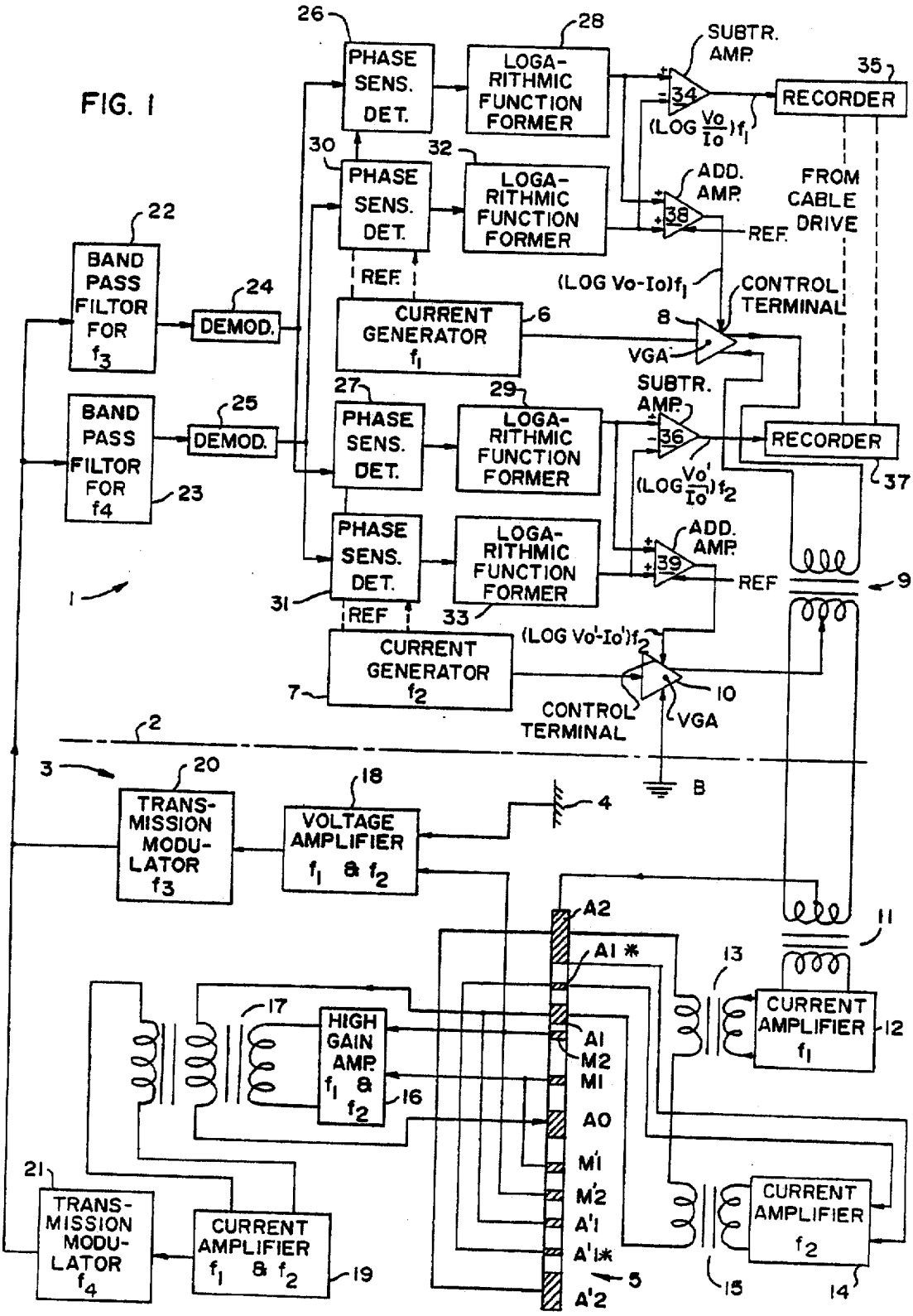
FIG. 1 represents schematically the apparatus of the invention.

The apparatus in accordance with the invention, as shown in FIG. 1, comprises surface equipment 1, the surface being represented by a broken line 2, and a probe 3 which can be lowered into a borehole by means of a cable connecting it electrically and mechanically to the surface equipment; the shielding of this cable appears at 4 in the figure.

The essential part of the probe consists of a system of electrodes 5 distributed longitudinally whose respective distances are invariable. Conventionally, this system comprises:

a central electrode $A_0$;

a first pair of electrodes $M_1$–$M'_1$ placed symmetrically on both sides of the electrode $A_0$;

a second pair of electrodes $M_2$–$M'_2$ placed symmetrically on both sides of the central electrode $A_0$ outside the first pair;

a third pair of electrodes $A_1$–$A'_1$ placed symmetrically on both sides of electrode $A_0$ outside the second pair;

and a fourth pair of electrodes $A_2$–$A'_2$ placed symmetrically on both sides of electrode $A_0$ outside the third pair; the distance between the central electrode $A_0$ and each of the electrodes $A_2$–$A'_2$ is smaller than that for which the said electrodes $A_2$ and $A'_2$ are considered to be electrically infinite in respect to the said central electrode; insulated conductors short-circuit the electrodes of each of the respective pairs.

On the surface of the apparatus comprises two generators of sinusoidal electric voltage 6 and 7 of respective frequencies $f_1$ and $f_2$. In the described embodiment $f_1=280$ Hz and $f_2=35$ Hz. These generators are advantageously synchronized by a time base, not shown. The voltage of frequency $f_1$ is used to drive a variable gain amplifier 8 which circulates in the primary winding of a transformer 9 a sinusoidal current of frequency $f_1$. The voltage of frequency $f_2$ is itself used to drive a variable gain amplifier 10 which delivers a sinusoidal current of frequency $f_2$ and whose two output terminals are connected respectively to an electrode B on the ground and to an intermediate point on the secondary winding of transformer 9. Two electrical conductors in the cable are connected to the terminals of this secondary winding and drive the input transformer 11 of a current amplifier 12 placed in the probe. The transformer is connected to electrodes $A_2$–$A'_2$ by an intermediate point on its primary winding. The current amplifier 12 is connected, by the secondary winding of its output transformer 13, between the electrodes $A_1$–$A'_1$ and $A_2$–$A'_2$. This amplifier is of interest in that its output impedance at the frequency $f_2$ is very low (0.1Ω) so that, at the same time, it supplies the electrode pairs $A_1$–$A'_1$ and $A_2$–$A'_2$ with alternating current of frequency $f_1$ and short circuits these at frequency $f_2$.

Given these conditions, it is immediately apparent the described arrangement makes it possible to circulate in the traversed formation an alternating current of frequency $f_1$ between the electrodes of the third and fourth pairs and to circulate an alternating current of frequency $f_2$ between the surface electrode B and these same electrodes then short-circuited.

Nonetheless, the short circuit produced by amplifier 12 at frequency $f_2$ may be insufficient in all cases, and in particular when the subsurface earth formations being investigated show low resistivity or when the conducting fluid filling the borehole does not permit good contact with the electrodes in question. For this reason, in accordance with the invention, additional arrangements are provided designed to guarantee the short circuit. For this purpose, the system of electrodes 5 is completed with a fifth pair of electrodes $A_1^*$ –$A'_1{}^*$ placed symmetrically on both sides of the central electrode $A_0$ between electrodes $A_1$–$A_2$ and $A'_1$–$A'_2$, respectively, in the neighborhood of electrodes $A_1$–$A'_1$. These additional electrodes are also short-circuited by a conductor. One of the input terminals of a current amplifier 14 is connected to the electrodes $A_2$–$A'_2$ of the fourth pair and the other to the electrodes. $A_1^*$–$A'_1{}^*$ of the fifth pair, while the secondary winding of its output transformer 15 is connected in series with the secondary winding of the transformer 13 between the electrodes of the third and fourth pairs. Starting with the measurement of the potential difference between the electrode pairs $A_2$–$A'_2$ and $A_1^*$–$A'_1{}^*$, the basic role of this amplifier, which operates solely at frequency $f_2$, is to deliver to the circuit connecting the pair $A_1$–$A'_1$ with the pair $A_2$–$A'_2$ a current of frequency $f_2$ annulling the said potential difference and thus bringing the formations in the immediate vicinity of the electrode pairs $A_1$–$A'_1$ and $A_2$–$A'_2$ to the same potential. As a result, the short circuit at frequency $f_2$ is always ensured.

The current of frequency $f_1$ circulating in the formations between electrodes $A_1$–$A_2$ and $A'_1$–$A'_2$, and the current of frequency $f_2$ circulating between the above-mentioned short-circuited electrodes and surface electrode B, produce alternating potential differences of respective frequencies $f_1$ and $f_2$ in the liquid filling the borehole, between the voltage electrodes $M_1$–$M_2$ and $M'_1$–$M'_2$. These potential differences are transmitted to the input terminals of a high-gain amplifier 16; the secondary winding of its output transformer 17 is connected between the central electrode $A_0$ and the electrode pair $A_1$–$A'_1$. By circulating given currents between these electrodes, the basic role of this amplifier, which operates at frequencies $f_1$ and $f_2$, is to maintain substantially at zero the potential differences between the voltage electrodes $M_1$–$M_2$ and $M'_1$–$M'_2$, which produces electrical "blocking" of the borehole such that the current of frequency $f_1$ flowing in the traversed formations, from electrode $A_0$ to electrodes $A_2$–$A'_2$ and the current of frequency $f_2$ flowing from electrode $A_0$ towards electrode B have, over a certain distance, a radial direction substantially perpendicular to the axis of the borehole. Under these conditions, the input transformer of a voltage amplifier 18 is connected between the shielding 4 of the cable connecting the surface with the probe and a point in the survey borehole where the amplifier 16 maintains a substantially zero gradient, such that the electrode $M_2$ measures a voltage $V_0$ of frequency $f_1$ characteristic of the flow of the electrical current of frequency $f_1$ through the formations located at a relatively small lateral distance from the wall of the borehole and a voltage $V'_0$ of frequency $f_2$ characteristic of the flow of the electrical current of frequency $f_2$ in the formations extending over a relatively large lateral distance from the said wall. The input of a current amplifier 19 is connected to and the secondary winding of the transformer 17. This amplifier measures a current $I_0$ of frequency $f_1$ and a current $i'_0$ of frequency $f_2$ which are representative of the emission by the central electrode $A_0$.

The voltages $V_0$–$V'_0$ and currents $I_0$–$I'_0$ measured respectively by the amplifiers 18 and 19 are transmitted to the surface by means of a remote measuring system. For this purpose, the voltages $V_0$–$V'_0$ modulate at 20 a frequency $f_3$, and currents $I_0$–$I'_0$ modulate at 21 a frequency $f_4$. These frequencies are preferably of several hundred kHz. For example $f_3$=120 kHz, and $f_4$=78 kHz. The output signals of modulators 20 and 21 are led to the surface via the electrical conductors in the cable and simultaneously drive, on arrival, two filters 22 and 23 which only pass respectively the signals corresponding to the modulations of frequencies $f_3$ and $f_4$. Each of the two filters is followed by a demodulation circuit 24 and 25 at the output of which are found respectively the measurements of voltages $V_0$–$V'_0$ and currents $I_0$–$I'_0$ supplied by probe amplifiers 18 and 19.

For each frequency $f_1$ and $f_2$, the measurement signals $V_0$–$V'_0$ and $I_0$–$I'_0$ are treated identically. The output of demodulator 24 is connected simultaneously to two phase detector circuits 26 and 27 followed by logarithmic function former circuits 28 and 29 at whose output appear the Log $V_0$ and Log $V'_0$ functions at the respective frequencies $f_1$ and $f_2$. Similarly, the output of demodulator 25 is connected simultaneously to two phase detector circuits 30 and 31 also followed by logarithmic function former circuits 32 and 33 at the output of which appear the Log $I_0$ and Log $I'_0$ functions corresponding to the respective frequencies $f_1$ and $f_2$. The reference for the phase detection at frequency $f_1$ is provided by generator 6, whereas the reference for phase detection at frequency $f_2$ is provided by generator 7.

The outputs of the former circuits 28 and 32 are connected to the input terminals of a substraction amplifier 34 allowing the galvanometer 35 which follows it to record the Log $V_0/I_0$ function corresponding to frequency $f_1$, directly proportional to the logarithm of the resistivity of the formations located at a small lateral distance from the probe. Similary, the outputs of former circuits 29 and 33 are connected to the input terminals of a subtraction amplifier 36 allowing the galvanometer 37 which follows it to record the Log $V'_0/I'_0$ function corresponding to frequency $f_2$, directly proportional to the logarithm of the resistivity of the formations extending over a relatively large lateral distance from the probe.

In addition, the former circuits 28 and 32 drive an addition amplifier 38 which produces the Log $V_0$ $I_0$ function corresponding to frequency $f_1$ and delivers an error signal representative of the difference between the said function and a reference value Ref. This error signal then controls the gain of amplifier 8 acting on the amplitude of the alternating current of frequency $f_1$ supplied to the probe so as to maintain the product $V_0 \cdot I_0$ constant. in the same manner, former circuits 29 and 33 drive an addition amplifier 39 whose role is to produce the Log $V'_0 \cdot I'_0$ function corresponding to frequency $f_2$ and to deliver an error signal representative of the difference between the said function and a reference value Ref'. This error signal controls the gain of amplifier 10 so as to maintain the product $V'_0 \cdot I'_0$ constant at frequency $f_2$. These arrangements, shown in greater detail in French Pat. No. 1,552,081 corresponding to U.S. Pat. No. 3,539,910 issued on Nov. 10, 1970 and its addition U.S. Pat. No. 2,082,203, thus ensure operation of the apparatus at constant power which allows the reduction of the dynamic range of the measurement signals, a reduction known to guarantee good accuracy of measurement for all resistivity values, but also excellent transmission to the surface by frequency modulation of the measured signals.

It can easily be seen that the results of the investigation of zones located at small distances from the probe depend considerably on its position in respect to the center of the borehole. For this reason, it is preferable to install hinged pads on the probe body member which, thrust against the wall, maintain the apparatus substantially along the axis of the borehole.

Figure 2:
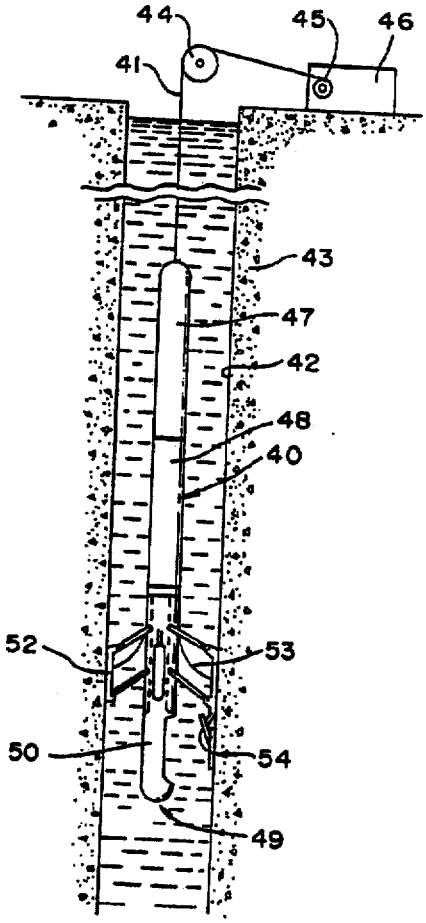
FIG. 2 is a general view of this apparatus in the measuring position in a borehole.

FIG. 2, which illustrates this form of arrangement, shows a probe 40 suspended from the end of a cable 41 in a borehole 42 traversing formations 43. The cable runs over a pulley 44 and winds around a winch 45 belonging to the surface unit 46. The probe 40 consists of three sections 47, 48 and 49. The upper section 47 contains the circuits 16 to 21 (FIG. 1) whereas the intermediate section 48 contains the system of electrodes. The lower section 49 comprises a body member 50 on which are hinged four centering pads such as 52. Each of them is urged away from the said body member by a spring 53 which thrusts it against the wall of the borehole. The upper part of section 49 contains also a hydraulic device which can retract the pads against the sonde.

According to an advantageous embodiment allowing an important reducing in length of the sonde, the electrodes $A_2$ and $A'_2$ are not contained in the intermediate section 48 but they are formed respectively by the upper section 47 and the lower section 49.

The apparatus just described measures the electrical resistivities of the subsurface earth formations which extend over relatively small and relatively large lateral distances from the wall of the borehole. Nonetheless, it is extremely useful to simultaneously measure the resistivity of the zones very close to the wall likely to be washed by the filtrate of the borehole fluid in order to obtain an immediate correlation between these three measurements. For this reason, in accordance with the invention, with the apparatus is combined a device for investigating the formations at a very short distrance from the wall but which is nevertheless unaffected by the mudcake. For example, such a device can be of the type shown in French Pat. No. 2,042,977, and installed on a measuring pad connected to the probe body member by a hinged arm in order to come in contact with the wall.

In such a device, a central point electrode emits both a main current which returns to the metal body of the pad and an auxiliary current which returns to an electrode concentric with the central electrode. Between two other concentric electrodes this circulation of current causes a potential difference to appear which is constantly maintained at a small or zero value by servo control of one of the main or auxiliary currents. In this manner, the auxiliary currents can be made to propagate primarily in the mudcake, forcing the main current to return to the pad body following a path traversing the formation. Consequently, the measurement of the effects associated with the circulation of the main current gives the value of the resistivity of the zone located at a very short distance from the wall, in other words the zone likely to be washed by the borehole fluid. It is important to note that, becuase of its accuracy, such measurement also provides an excellent reference for subsequent correlation of several successive well logging operations.

It is then particularly advantageous to adopt the arrangement shown in FIG. 2 and described more completely in French Pat. No. 2,052,062 in which the measuring pad, schematically represented at 54, is carried by one of the centering pads 52. The two pads are connected together by a linkage designed such that measuring pad 54 is in constant contact with the formations even if the wall of the borehole is uneven.

The circuits associated to the pad 54 are contained in the lower section 49 of the sonde. If the electrodes $A_2$ and $A'_2$ are not in the intermediate section 48, the lower section 49 forms the electrode $A'_2$ and also the electrode to which returns the main current emitted by the central electrode of the pad 54.

Of course, this invention is not limited to the embodiment shown and described by way of example. The scope of the invention also extends to variations in part or all of the described arrangements which constitute equivalents, as well as to all applications of such arrangements.

I claim:

1. An apparatus for the electrical investigation of earth formations traversed by a borehole, comprising:

a. an electrode system comprising a central electrode *for emitting current having frequencies $f_1$ and $f_2$ into said formation* and four pairs of electrodes respectively shortcircuited and aligned symmetrically about said central electrode at increasing distances therefrom, the central electrode and the electrodes of the third and fourth pairs being called current electrodes, the electrodes of the first and second pairs being called voltage electrodes;

b. means for producing an alternating current at a first frequency, $f_1$, coupled between the [electrodes of the fourth pair and at least one of the other current electrodes] *third electrode pair and the fourth electrode pair to focus $f_1$ current emitting from said central electrode*;

c. means for producing an alternating current at a second frequency, $f_2$, coupled between [one of the current electrodes and] an electrode at electrical infinity with respect to the electrode system, *and one of the third and fourth electrode pairs, said one of the third and fourth electrode pairs being further coupled through a low impedance at frequency $f_2$ with the other of said third and fourth electrode pairs to focus $f_2$ current emitting from said central electrode*;

d. means for maintaining the potential difference between the first and second pairs of electrodes at substantially zero, said means adapted to monitor the potential difference between the first and second pairs of electrodes and to emit current from the central current emitting electrode in response to the measured potential difference to reduce the potential difference to zero; and e. means for measuring the electrical potential proximate to one of the first and second pairs of electrodes and the current emitted from the central electrode to produce therefrom signals representative of the electrical resistivity of the formation [located] at different lateral distances from the borehole.

2. The apparatus of claim 1 wherein said means for producing an alternating current at frequency $f_1$ is coupled between said third and fourth pairs of electrodes and said means for producing an alternating current at frequency $f_2$ is coupled between the fourth pair of current electrodes and the electrode at electrical infinity, *said third and fourth pairs of electrodes being coupled by a relatively high-impedance path at frequency $f_1$ and by a low-impedance path at frequency $f_2$.*

3. The apparatus of claim 2 further comprising means *coupled between the electrodes of the third and fourth pairs of electrodes* for maintaining at the frequency $f_2$ a potential gradient of predetermined value [between the electrodes of the third and fourth pairs of electrodes] *therebetween.*

4. The apparatus of claim 3 wherein the potential gradient between the third and fourth pairs of electrodes at frequency $f_2$ is maintained at substantially zero volts.

5. The apparatus of claim 3 wherein the means for maintaining a predetermined potential gradient between the third and fourth pairs of electrodes comprises;

a. a fifth pair of electrodes positioned one on each side of the central electrode between the third and fourth pairs of electrodes; and b. means for measuring the potential gradient at frequency $f_2$ between the fourth and fifth pairs of electrodes and adapted to supply a current to the formation at the frequency $f_2$ in response to the potential difference between the fourth and fifth pairs of electrodes to maintain the potential difference between the fourth and fifth electrodes at the predetermined potential gradient.

6. An apparatus for investigating earth formations traversed by a borehole, comprising:

a plurality of electrodes adapted for movement through a borehole, said electrodes comprising a central current [emitting] electrode, first and second pairs of potential monitoring electrodes positioned on opposite sides of the central electrode and first and second pairs of current electrodes positioned on opposite sides of the central current [emitting] electrode and further from the central electrode than the potential monitoring electrodes;

*b. means for controllably supplying current having frequencies $f_1$ and $f_2$ from the central current electrode;*

[b.] *c.* means for producing a current at frequency $f_1$ coupled between the first and second pairs of current [emitting] electrodes *to focus $f_1$ current emitting from the central current electrode;*

[c.] *d.* means for producing a current at frequency $f_2$ coupled between the second pair of current [emitting] electrodes and a point at electrical infinity from said plurality of electrodes *to focus $f_2$ current emitting from the central current electrode;*

[d] *e.* means *coupled between the first and second pair of current electrodes* for maintaining the impedance [between the first and second pair of current emitting electrodes] *therebetween* at frequency $f_2$ substantially equal to zero;

[e] *f.* means for maintaining the potential difference between the first and second pairs of potential monitoring electrodes substantially at zero volts, said means adapted to monitor the potential difference between the first and second pairs of potential electrodes and to [supply] *control the* current *supplied* from the central current [emitting] electrode in response to the potential difference between the first and second pairs of potential electrodes to maintain the potential difference substantially equal to zero; and

[f] *g.* means for measuring the potential proximate to the potential monitoring electrodes and the current emitted from the central electrode and to provide output signals representative of the resistivity at different lateral distances from the borehole wall.

7. The apparatus of claim 6 wherein the means for producing currents at frequencies $f_1$ and $f_2$ comprise:

a. a current amplifier, the output of the amplifier being coupled between the first and second pairs of current electrodes and having an output impedance substantially equal to zero at the frequency $f_2$;

b. a source of alternating current of frequency $f_1$ coupled to the input of the current amplifier; and c. a source of alternating current of frequency $f_2$ coupled betwen the second pair of current electrodes and a point at a substantial electrical distance from the plurality of electrodes.

8. The apparatus of claim 7 wherein the sources of alternating current of frequencies $f_1$ and $f_2$ each comprise a variable gain amplifier allowing an adjustment of the amplitude of the said currents.

9. The apparatus of claim 8 wherein said sources of alternating current of frequencies $f_1$ and $f_2$ are synchronized.

10. The apparatus of claim 6 wherein the means for maintaining the impedance of frequency $f_2$ between the first and second pairs of current electrodes substantially equal to zero, comprises:

a. a third pair of electrodes positioned between said first and second pairs of current emitting electrodes; and b. a current amplifier means having an input coupled between the second pair of current emitting electrodes and the third pair of electrodes and an output coupled between the first and second pairs of current emitting electrodes, the amplifier means being adapted to supply current at frequency $f_2$ to the formation in response to a potential difference at frequency $f_2$ measured between the second pair of current emitting electrodes and the third pair of electrodes to maintain the potential difference between the first and second pairs of current emitting electrodes at frequency $f_2$ substantially equal to zero.

11. The apparatus of claim 6 further comprising:

a. means coupled to said current and voltage measuring means adapted to separate the measured currents and voltages into components at frequencies $f_1$ and $f_2$ and to provide signals representative of the current and voltage at frequencies $f_1$ and $f_2$;

b. means adapted to receive the current and voltage signals at frequency $f_1$ and to provide a first output signal representative of the resistivity of a first zone in the formation; and c. means adapted to receive the current and voltage signals at frequency $f_2$ and to provide a second output signal representative of the resistivity of a second zone in the formation.

12. The apparatus of claim 11 further comprising means adapted to receive said first and second output signals for recording said first and second output signals as a function of depth.

13. The apparatus of claim 12 wherein one of the input terminals of the said voltage measuring means is connected to the electrodes of the second pair of electrodes.

14. The apparatus of claim 11 wherein the means adapted to separate the measured current and voltage signals comprise:

a. two frequency modulators, the input of one coupled to the output of the voltage measuring means and the input of the other coupled to the output of the current measuring means and operating respectively at frequencies $f_3$ and $f_4$;

b. two filters coupled respectively to the outputs of the modulators, one filter adapted to pass the signals of frequency $f_3$ and the other filter adapted to pass the signals of frequency $f_4$; and c. two demodulators coupled to the outputs of the filters adapted to demodulate the signals at frequencies $f_3$ and $f_4$.

15. The apparatus of claim 11 further comprising means adapted to receive said current and voltage signals at frequency $f_1$ and to produce a first error signal representative of the difference between the product of the voltage multiplied by the current and voltage signals at frequency $f_2$ and to produce a second error signal representative of the difference between the product of the voltage multiplied by the current and a reference value, said first and second error signals being supplied respectively to the sources of alternating current of frequencies $f_1$ and $f_2$ to control the gain of the output of said sources so as to keep the product of the current and voltage constant.

*16. An apparatus according to claim 1, wherein said means for producing an alternating current at frequency $f_1$ is coupled between said third and fourth pairs of electrodes, said means for producing an alternating current at frequency $f_2$ is coupled between one of the third and fourth pairs of electrodes and the electrode at electrical infinity and said third and fourth pairs of electrodes are coupled with a relatively low impedance at $f_2$ and a relatively high impedance at $f_1$.*

*17. An apparatus according to claim 16, in which said third and fourth pairs of electrodes are coupled by frequency dependent circuit means.*

*18. An apparatus according to claim 17, in which said means for producing an alternating current at frequency $f_1$ includes an output coupled between said third and fourth pairs of electrodes, said output circuit comprising said frequency dependent circuit means and having a relatively high impedance at frequency $f_1$ and a relatively low impedance at frequency $f_2$.*

*19. An apparatus according to claim 17, in which said frequency dependent circuit means also couples said means for producing an alternating current at said first frequency between said third and fourth pairs of electrodes.*

*20. An apparatus according to claim 6, in which said means for maintaining the impedance between the first and second pairs of current emitting electrodes at frequency $f_2$ substantially equal to zero comprises frequency dependent circuit means having substantially zero impedance at frequency $f_2$.*

*21. An apparatus according to claim 20, in which said frequency dependent circuit means has substantial impedance at frequency $f_1$.*

*22. An apparatus according to claim 20, in which said means for producing a current at frequency $f_1$ includes an output circuit coupled between said first and second pairs of current emitting electrodes, said output circuit comprising said frequency dependent circuit means and having a relatively high impedance at frequency $f_1$ and a relatively low impedance at frequency $f_2$.*

* * * * *